(12) United States Patent
Baik (10) Patent No.: US 11,230,324 B2
(45) Date of Patent: Jan. 25, 2022

(54) VEHICLE COMPONENT MOUNTING UNIT

(71) Applicants: HYUNDAI MOTOR COMPANY, Seoul (KR); KIA MOTORS CORPORATION, Seoul (KR)

(72) Inventor: Hyoung Kwon Baik, Jeonju-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/892,570

(22) Filed: Jun. 4, 2020

(65) Prior Publication Data

US 2021/0163077 A1   Jun. 3, 2021

(30) Foreign Application Priority Data

Nov. 29, 2019   (KR) .................. 10-2019-0157338

(51) Int. Cl.
  *B62D 27/06*   (2006.01)
  *B62D 27/02*   (2006.01)
  *B62D 65/02*   (2006.01)

(52) U.S. Cl.
  CPC .......... *B62D 27/065* (2013.01); *B62D 27/02* (2013.01); *B62D 65/02* (2013.01)

(58) Field of Classification Search
  CPC .............................. B62D 65/02; B62D 27/065
  USPC ....................................... 296/187.01, 29, 30
  See application file for complete search history.

(56) References Cited

U.S. PATENT DOCUMENTS 6,695,368 B1 * 2/2004 Weykamp ............... B60R 19/26
                                                           293/122
9,150,253 B2 * 10/2015 Watanabe ............ B62D 25/082

FOREIGN PATENT DOCUMENTS

JP   2011-98645     *  5/2011
JP   2018192501 A   * 12/2018

* cited by examiner

*Primary Examiner* — Dennis H Redder
(74) *Attorney, Agent, or Firm* — McDonnell Boehnen Hulbert & Berghoff LLP (57) ABSTRACT

A vehicle component mounting unit for mounting a component assembly to a frame with a closed cross-section including a mounting plate formed with at least one bolt engagement hole and conjoined to the frame, and a weld nut formed with a nut hole connected to the bolt engagement hole, welded to the mounting plate, and fitted to a mounting hole formed in the frame.

8 Claims, 6 Drawing Sheets

VEHICLE COMPONENT MOUNTING UNIT

CROSS-REFERENCE TO RELATED APPLICATION

This application claims priority to and the benefit of Korean Patent Application No. 10-2019-0157338 filed in the Korean Intellectual Property Office on Nov. 29, 2019, the entire contents of which are incorporated herein by reference.

BACKGROUND

(a) Field

An exemplary embodiment relates to a parts mounting structure for a vehicle.

(b) Description of the Related Art

In general, fastening members including a bolt and a nut are typical mechanical elements for joining two or more parts. Such fastening members are used in various machinery industry fields including the vehicle manufacturing field.

In the process of assembling assembly components to a vehicle body during vehicle production, the assembly components are assembled to the vehicle body by using bolts and nuts.

On the other hand, in accordance with the government's policy to promote environment-friendly vehicles, electric or hydrogen bus development is recently in progress. Various electrical components are mounted on the electric or hydrogen bus to control and manage the driving of a drive motor and to charge the battery module. These electrical components are mounted in modularized (integrated) form for better assembly and safety.

As a module frame for mounting electrical components on a vehicle body in a modularized form, a frame structure made of square tubes is generally used in order to secure the assemblability of electrical components and to protect the electrical components from impacts.

For example, in the past, a hole is processed on a side of a square tube of a module frame, a nut is fixed inside the hole, and a bolt is engaged in the nut to mount a target component to the module frame.

However, this type of mounting may cause the mounted component to fall off in a high torque condition due to a lack of strength.

In another example, a hole is drilled in the up and down direction on a square tube of the module frame, a collar is attached to the hole, a bolt is attached to the collar, and the bolt is engaged to a mounting bracket of the target component to be assembled.

However, since such a mounting manner engages a nut to a bolt, it is difficult for a worker to engage a nut when a size of the target component is excessive.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a vehicle component mounting unit having advantages of capability of ensuring mounting strength and torque of a target component mounted on a module frame and securing reliability of bolt engagement work.

A vehicle component mounting unit for mounting a component assembly to a frame with a closed cross-section includes a mounting plate formed with at least one bolt engagement hole and conjoined to the frame, and a weld nut formed with a nut hole connected to the bolt engagement hole, welded to the mounting plate, and fitted to a mounting hole formed in the frame.

The exemplary vehicle component mounting unit may further include an engagement bolt engaged with the nut hole of the weld nut through the bolt engagement hole.

The engagement bolt may be engaged with the weld nut at a top of the frame.

The mounting plate may be formed as a rectangular plate, and may include a first reinforcing surface supporting a mounting bracket of the component assembly, and a second reinforcing surface supporting an upper surface of the frame.

A top of the weld nut may be welded to an edge of the bolt engagement hole of the second reinforcing surface.

An interior diameter of the nut hole of the weld nut may be smaller than an interior diameter of the bolt engagement hole.

A notch hole of a slit shape may be formed in the mounting plate.

The mounting plate may be welded to the frame through a first welding portion formed along an edge of the notch hole and a second welding portion formed at both ends of the mounting plate.

The exemplary vehicle component mounting unit may further include a bush member inserted into the mounting hole of the frame and supporting the weld nut.

The frame may be formed as a square tube.

The component assembly including electrical components of an electric or hydrogen vehicle may be mounted to the mounting plate through a mounting bracket.

In an exemplary embodiment, a stable mounting position of a component assembly may be secured with respect to a frame, mounting strength and torque of the component assembly with respect to the frame may be increased.

Further, effects that can be obtained or expected from exemplary embodiments of the present disclosure are directly or suggestively described in the following detailed description. That is, various effects that are predicted according to an exemplary embodiment will be described in the following detailed description.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clarify the present disclosure, parts that are not connected to the description will be omitted, and the same elements or equivalents are referred to with the same reference numerals throughout the specification.

Such drawings are a mere reference for specifically and clearly describing an exemplary embodiments and technical ideas or features of the present disclosure, and thus, may be different from actual product specifications.

Also, the size and thickness of each element are arbitrarily shown in the drawings, but the present disclosure is not necessarily limited thereto, and in the drawings, the thickness of layers, films, panels, regions, etc., are exaggerated for clarity.

In the following description, dividing names of components into first, second, and the like is to divide the names because the names of the components are the same as each other and an order thereof is not particularly limited, In addition, unless explicitly described to the contrary, the word "comprise" and variations such as "comprises" or "comprising" will be understood to imply the inclusion of stated elements but not the exclusion of any other elements.

Furthermore, each of terms, such as " . . . unit", " . . . means", " . . . part", and " . . . member" described in the specification, mean a unit of a comprehensive element that performs at least one function or operation.

Figure 1:
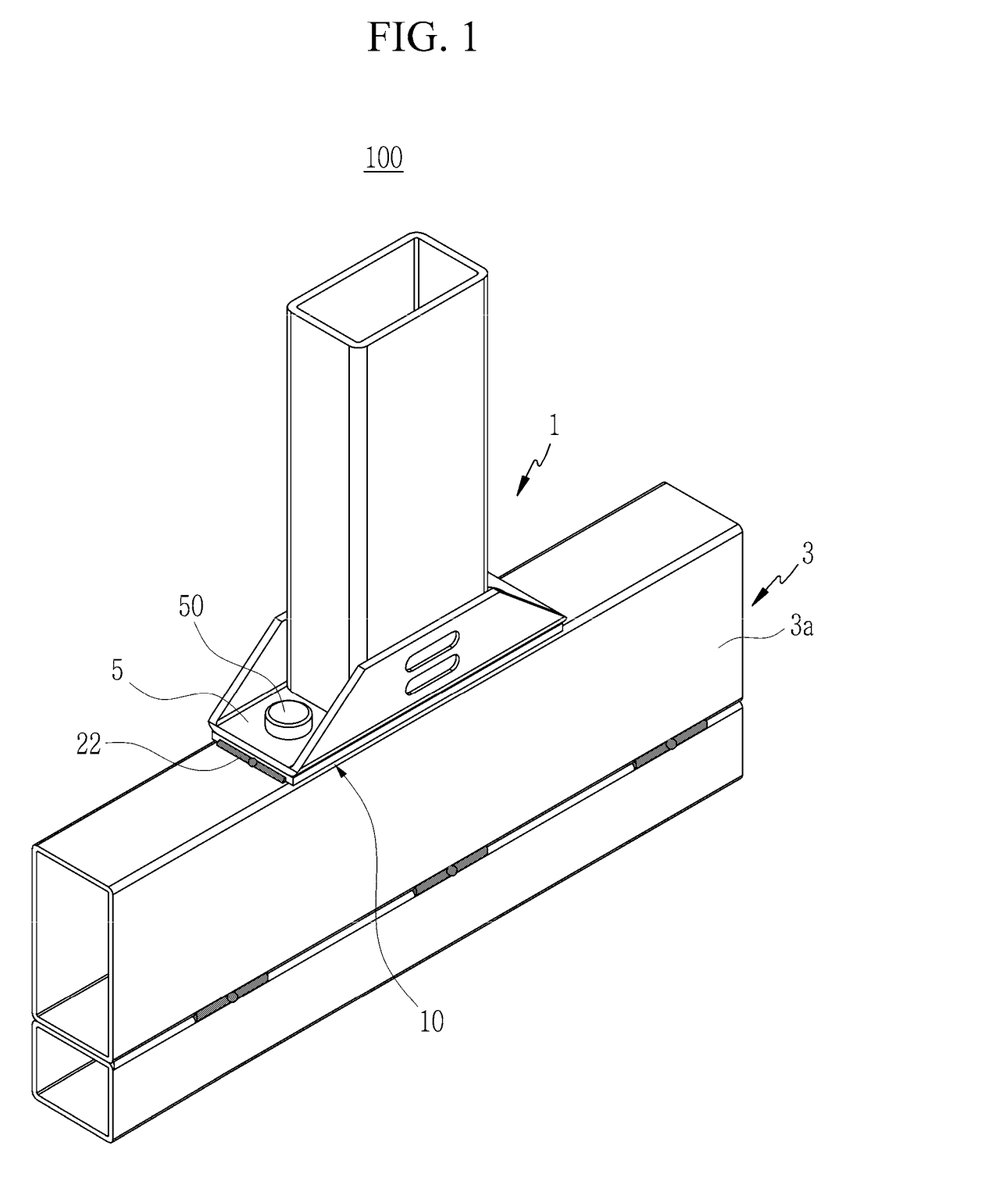
FIG. 1 is a perspective view of a vehicle component mounting unit according to an exemplary embodiment.
Figure 2:
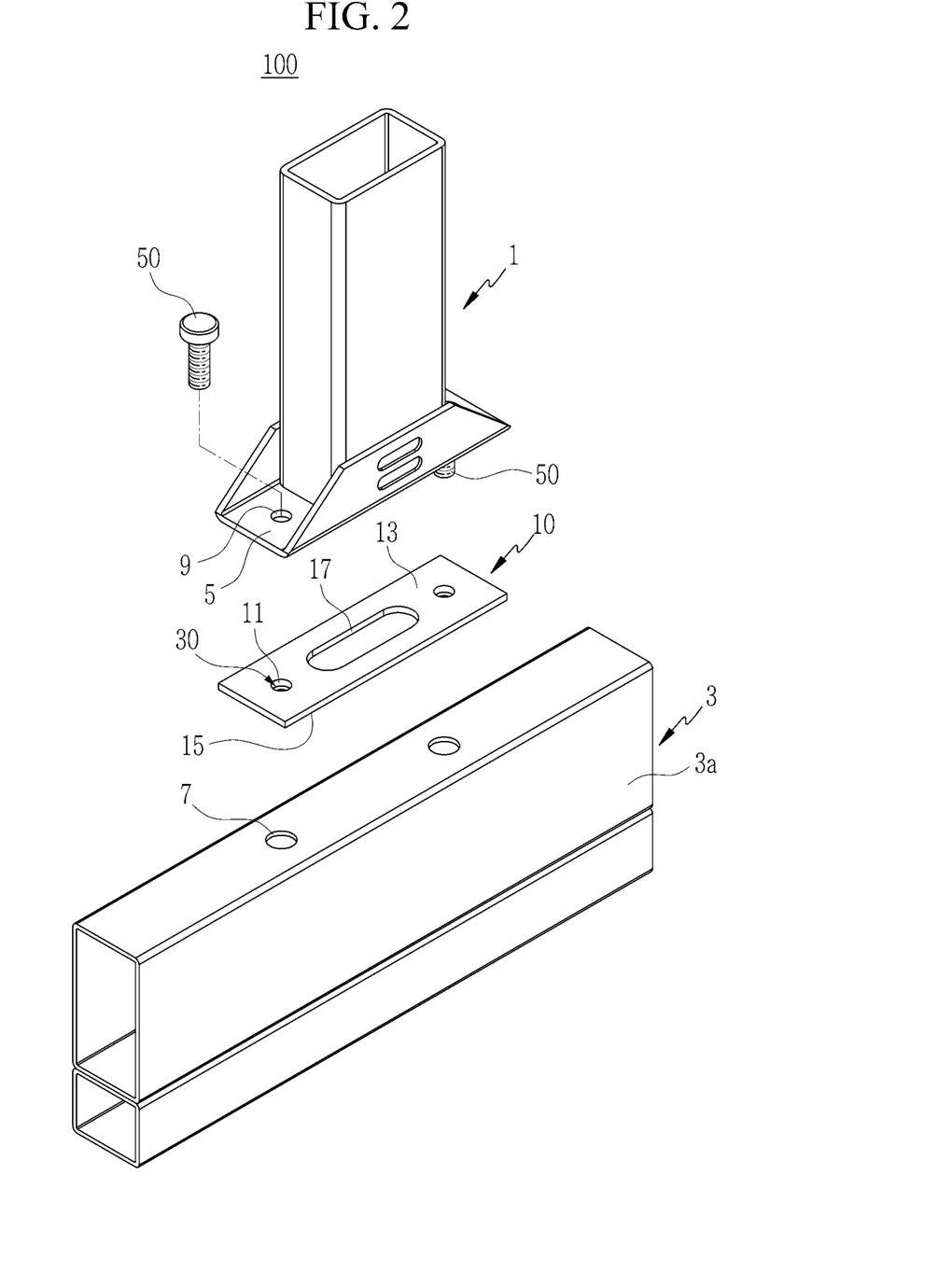
FIG. 2 is an exploded perspective view of a vehicle component mounting unit according to an exemplary embodiment.
Figure 3:
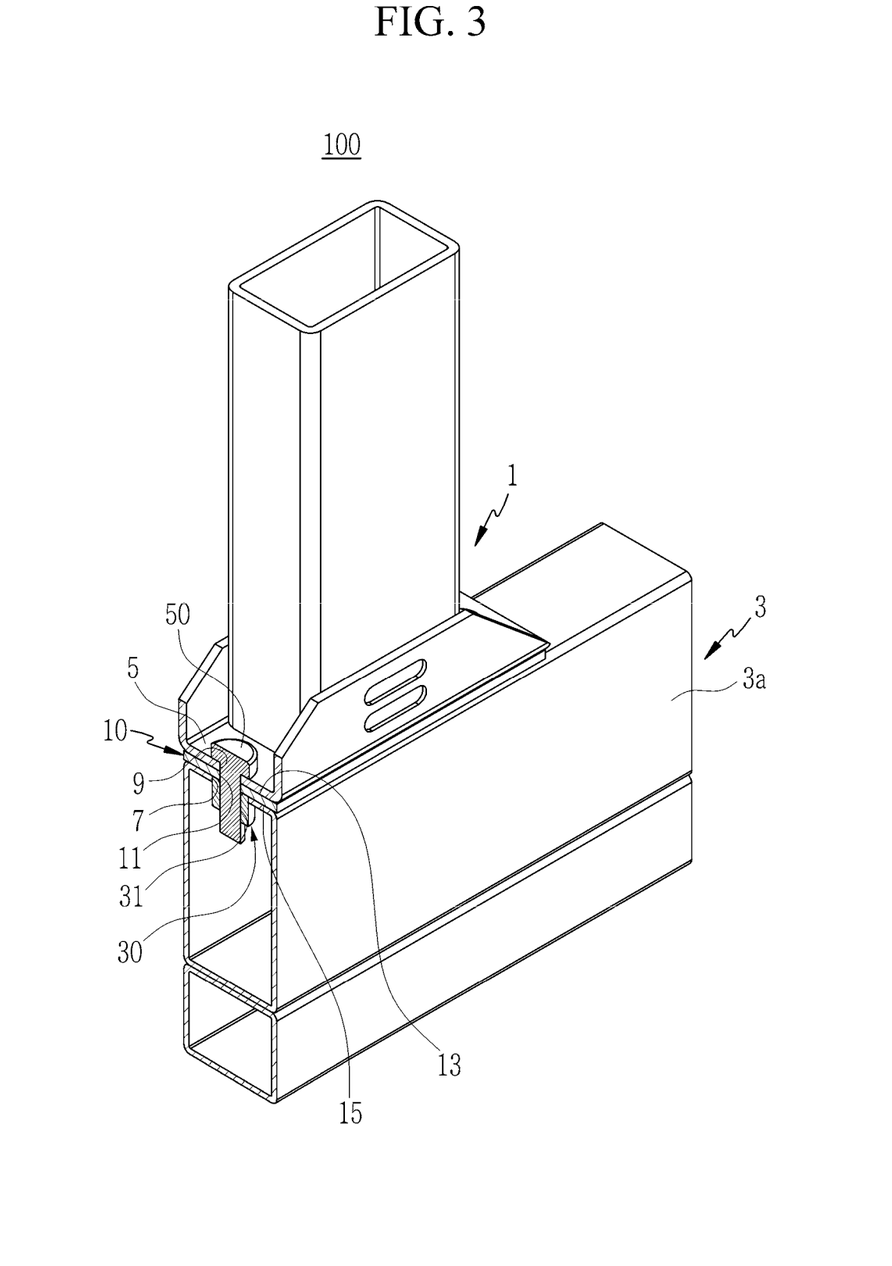
FIG. 3 is a cross-sectional view of a vehicle component mounting unit according to an exemplary embodiment.

FIG. 1 is a perspective view of a vehicle component mounting unit according to an exemplary embodiment, FIG. 2 is an exploded perspective view of a vehicle component mounting unit according to an exemplary embodiment, and FIG. 3 is a cross-sectional view of a vehicle component mounting unit according to an exemplary embodiment.

Referring to FIG. 1 to FIG. 3, a vehicle component mounting unit 100 according to an exemplary embodiment may be applied to a process of mounting various component assemblies 1 on a vehicle body in a vehicle manufacturing factory.

Furthermore, the a vehicle component mounting unit 100 according to an exemplary embodiment may be applied to a process of mounting a component assembly 1 of various electrical components applied to an electric bus or a hydrogen bus vehicle in a module form on a vehicle body.

Here, the component assembly 1 may be mounted on a module frame 3 (hereinafter referred to as "frame" for convenience) configured on a vehicle body, by a fastening member such as a bolt through a mounting bracket 5.

For example, the frame 3 partitions electrical components of the component assembly 1, and being a frame assembly supporting the component assembly 1, may include a square tube 3a having upper and lower surfaces and a closed cross-section.

In the above, as an example of target components, the electrical components of the component assembly 1 are described to be mounted on the frame 3, but the present disclosure is not necessarily limited thereto. Various vehicle assembly components such as an engine, a transmission, and a suspension may also be applied with the spirit of the present disclosure only if they are to be mounted to a vehicle body.

Hereinafter, the mounting structure of component assembly 1 will be described based on an example of mounting the component assembly 1 on the upper surface of frame 3, as in the drawing. For convenience of understanding, a portion facing upwards in the drawings is called an upper end portion, an upper portion, an upper end, an upper surface, and the like, and a portion facing downwards is called a lower end portion, a lower portion, a lower end, a lower surface, and the like.

However, the above definition of the directions has a relative meaning, and since the directions may vary according to a mounting direction or the like of the assembly 1 with respect to the frame 3, the above-mentioned reference direction is not necessarily limiting a reference direction of the present disclosure.

In addition, hereinafter, an "end (one end, another end, and the like)" may be defined as any one end or may be defined as a portion (one end portion, another end portion, and the like) including that end.

A vehicle component mounting unit 100 according to an exemplary embodiment is made of a structure that may secure a mounting strength and torque of component assembly 1 for frame 3 and ensure the reliability of a bolt engagement work.

For such a purpose, the vehicle component mounting unit 100 according to an exemplary embodiment includes a mounting plate 10, a weld nut 30, and an engagement bolt 50.

In an exemplary embodiment, the mounting plate 10 is a plate on which the mounting bracket 5 of the component assembly 1 is mounted, and may be a rectangular plate having an upper surface and a lower surface.

At least one bolt engagement hole 11 is formed in the mounting plate 10, and the lower surface may be conjoined to the upper surface of the frame 3. The mounting plate 10 may be conjoined to the upper surface of frame 3 by welding (e.g. $CO_2$ welding).

Here, the mounting plate 10 includes a first reinforcing surface 13 supporting the mounting bracket 5 of the component assembly 1 and a second reinforcing surface 15 supporting the upper surface of the frame 3.

In the mounting plate 10, a notch hole 17 having a slit shape is formed separately from the bolt engagement hole 11. The notch hole 17 is configured to secure a welding property of the mounting plate 10 to the frame 3.

Figure 4:
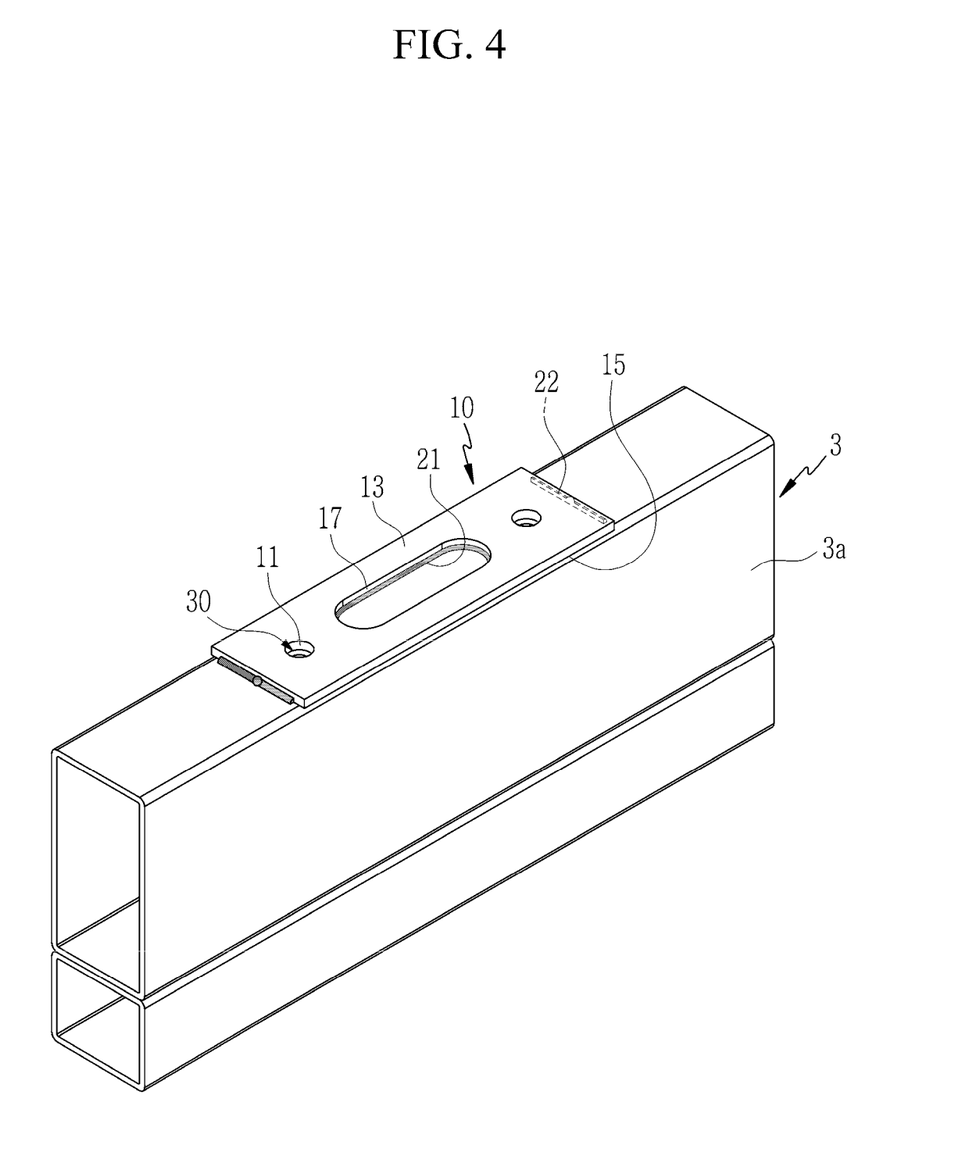
FIG. 4 is a perspective view of coupling structure of a frame and a mounting plate applied to a vehicle component mounting unit according to an exemplary embodiment.

Accordingly, as shown in FIG. 4, the mounting plate 10 may include a first welding portion 21 at an edge end of the notch hole 17 welded to frame 3, and a second welding portion 22 at both ends welded to frame 3.

In an exemplary embodiment, the weld nut 30 is formed with a nut hole 31 connected to the bolt engagement hole 11 of the mounting plate 10, and the weld nut 30 is welded to the lower surface of the mounting plate 10.

Figure 5:
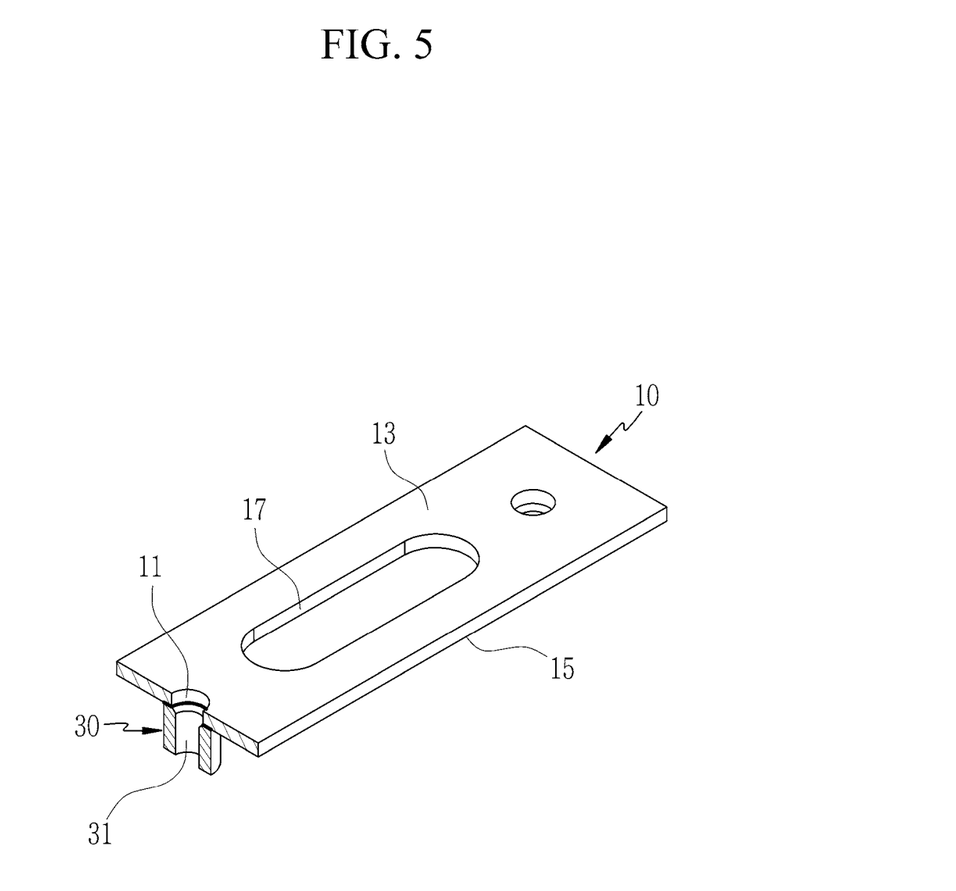
FIG. 5 is a partially cut-away perspective view of a mounting plate and a weld nut applied to a vehicle component mounting unit according to an exemplary embodiment.

As shown in FIG. 5, a top of the weld nut 30 is welded to an edge of the bolt engagement hole 11. Here, the interior diameter of the nut hole 31 of the weld nut 30 is smaller than the interior diameter of the bolt engagement hole 11.

The weld nut 30 is welded to the lower surface of the mounting plate 10 and is fitted into a mounting hole 7 provided in the frame 3. As the second reinforcing surface 15 of the mounting plate 10 contacts the upper surface of the frame 3, the weld nut 30 may be fully fitted into the mounting hole 7 of the frame 3.

That is, the mounting plate 10 is in contact with the upper surface of the frame 3 through the second reinforcing surface 15, and the weld nut 30 is inserted into the mounting hole 7. In such a state, the mounting plate 10 may be welded to the frame 3.

In an exemplary embodiment, the engagement bolt 50 is a fastening member to engage the component assembly 1 to the frame 3 through the mounting plate 10 and the weld nut 30. The engagement bolt 50 penetrates the mounting bracket 5 of the component assembly 1 and is engaged with the nut hole 31 of the weld nut 30 through the bolt engagement hole 11 of the mounting plate 10.

Here, the engagement bolt 50 may be engaged with the weld nut 30 through the mounting bracket 5 on the upper surface of the frame 3.

Hereinafter, an assembly process of a vehicle component mounting unit 100 according to an exemplary embodiment and a vehicle component mounting method by using the vehicle component mounting unit 100 will be described in detail with reference to the drawings.

First, in an exemplary embodiment, the at least one mounting hole 7 is machined on the upper surface of the frame 3.

The lower surface of the mounting plate 10 is welded with the weld nut 30 formed with the nut hole 31 connected to the bolt engagement hole 11 of the mounting plate 10. That is, the weld nut 30 is welded to the edge of the bolt engagement hole 11 of the lower surface of the mounting plate 10.

With the mounting plate 10 provided as described above, the weld nut 30 is inserted into the mounting hole 7. At this time, the weld nut 30 is inserted into the mounting hole 7, while the second reinforcing surface 15, i.e., the lower surface of the mounting plate 10, contacts the upper surface of the frame 3.

Subsequently, in an exemplary embodiment, the mounting plate 10 is welded to the upper surface of the frame 3. In an exemplary embodiment, the edge of the notch hole 17 of the mounting plate 10 and the frame 3 are welded to each other to form the first welding portion 21, both ends of the mounting plate 10 and the frame 3 are welded to each other to form the second welding portion 22.

In such a state, in an exemplary embodiment, the mounting bracket 5 of the component assembly 1 is positioned on the upper surface of the mounting plate 10.

Here, the mounting bracket 5 is in contact with the first reinforcing surface 13, i.e., the upper surface of the mounting plate 10. In addition, a bolt insertion hole 9 provided in the mounting bracket 5 is aligned with the bolt engagement hole 11 of the mounting plate 10.

In addition, the engagement bolt 50 is engaged with the nut hole 31 of the weld nut 30 through the bolt insertion hole 9 of the mounting bracket 5 and the bolt engagement hole 11 of the mounting plate 10.

In an exemplary embodiment, the engagement bolt 50 is engaged with the weld nut 30 from the upper surface of the frame 3, through the bolt insertion hole 9 of the mounting bracket 5 and the bolt engagement hole 11 of the mounting plate 10, and thereby the component assembly 1 may be easily mounted on the frame 3.

According to a vehicle component mounting unit 100 according to an exemplary embodiment, the component assembly 1 may be mounted to the frame 3 through the mounting plate 10 having the weld nut 30 and welded to the frame 3 of the square tube 3a.

Therefore, in an exemplary embodiment, a stable mounting position of the component assembly 1 with respect to the frame 3 may be secured, and the mounting strength and torque of the component assembly 1 with respect to the frame 3 may be increased.

In addition, in an exemplary embodiment, since the weld nut 30 corresponding to various bolt diameters of the engagement bolt 50 may be provided, reliability of bolt engagement work may be secured.

Furthermore, in an exemplary embodiment, since the weld nut 30 is applied to the mounting plate 10, bolt engagement work may be performed at a top of the component assembly 1 regardless of the size of the component assembly 1.

Figure 6:
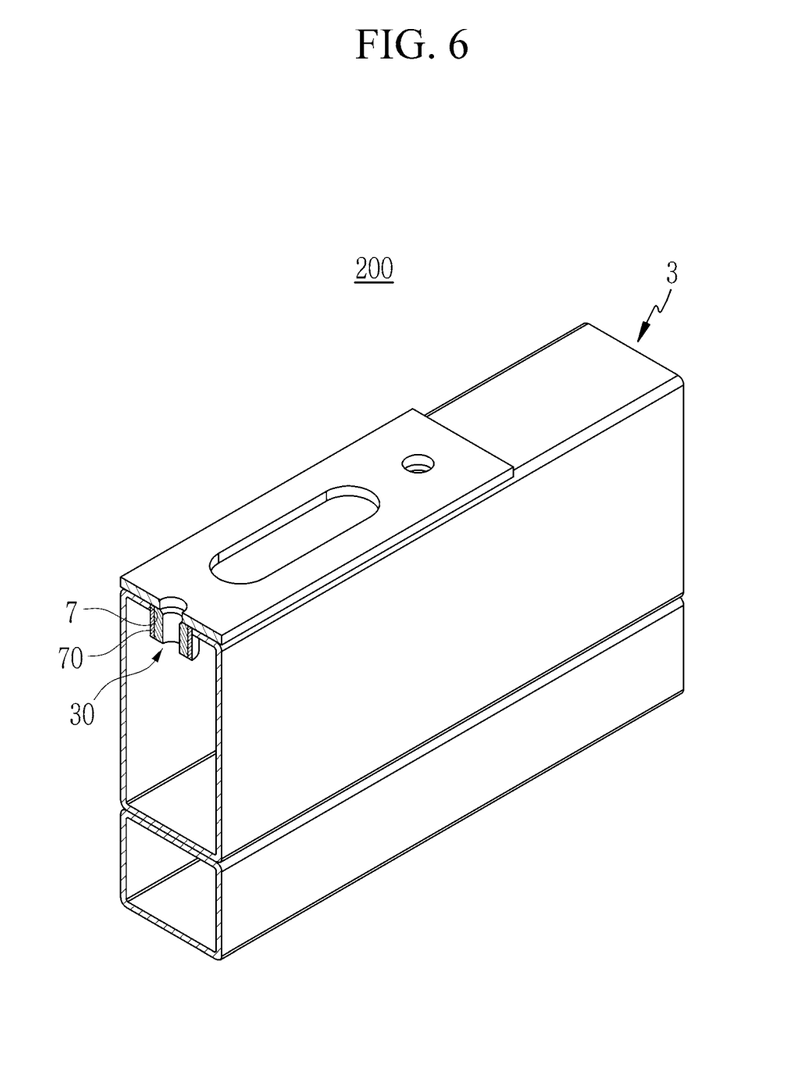
FIG. 6 is a cross-sectional view of a vehicle component mounting unit according to another exemplary embodiment of the present disclosure.

FIG. 6 is a cross-sectional view of a vehicle component mounting unit according to another exemplary embodiment of the present disclosure. The same components as those of the exemplary embodiment described above are given the same reference numerals.

Referring to FIG. 6, a vehicle component mounting unit 200 according to another exemplary embodiment of the present disclosure may further include, based on the structure of the above-described exemplary embodiment, a bush member 70 inserted into the mounting hole 7 of the frame 3 and supporting the weld nut 30.

The bush member 70 may be a cylindrical shape with open top and bottom ends to allow an insertion of the weld nut 30.

The bush member 70 may be fixedly fitted to the mounting hole 7 of the frame 3 in a forcedly fitting manner, or may be fixed by welding while being fitted to the mounting hole 7.

In addition, the bush member 70 may be fitted into the mounting hole 7 of the frame 3 while being forcedly fitted to the weld nut 30. Furthermore, the bush member 70 is fitted into the mounting hole 7 of the frame 3 while being coupled and welded to the weld nut 30.

Therefore, in an exemplary embodiment, as the bush member 70 supporting the weld nut 30 is provided, the mounting strength and torque of the component assembly (not shown) with respect to the frame 3 may be further increased.

Remaining configuration and operation and effect of a vehicle component mounting unit 200 according to another exemplary embodiment of the present disclosure is the same as in the above-described exemplary embodiment, and is not described in further detail.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A vehicle component mounting unit for mounting a component assembly to a frame with a closed cross-section, the vehicle component mounting unit comprising:
a mounting plate comprising at least one bolt engagement hole, the mounting plate being welded to the frame; and
a weld nut comprising a nut hole connected to the bolt engagement hole, welded to the mounting plate, and fitted to a mounting hole formed in the frame;
wherein a notch hole of a slit shape is formed in the mounting plate; and
wherein the mounting plate is welded to the frame through a first welding portion formed along an edge of the notch hole, and a second welding portion formed at both ends of the mounting plate.

2. The vehicle component mounting unit of claim 1, further comprising an engagement bolt engaged with the nut hole of the weld nut through the bolt engagement hole.

3. The vehicle component mounting unit of claim 2, wherein the engagement bolt is engaged with the weld nut at a top of the frame.

4. The vehicle component mounting unit of claim 1, wherein the mounting plate is formed as a rectangular plate, and comprises:
   a first reinforcing surface supporting a mounting bracket of the component assembly; and
   a second reinforcing surface supporting an upper surface of the frame.

5. The vehicle component mounting unit of claim 4, wherein a top of the weld nut is welded to an edge of the bolt engagement hole of the second reinforcing surface.

6. The vehicle component mounting unit of claim 5, wherein an interior diameter of the nut hole of the weld nut is smaller than an interior diameter of the bolt engagement hole.

7. The vehicle component mounting unit of claim 1, further comprising a bush member configured to be inserted into the mounting hole of the frame and supporting the weld nut.

8. The vehicle component mounting unit of claim 1, wherein the frame is formed as a square tube.

* * * * *